April 23, 1968 H. MAGNUSKI 3,380,023

ELECTRONIC ALARM SYSTEM

Filed Jan. 21, 1964 2 Sheets-Sheet 1

INVENTOR.
Henry Magnuski

BY
Mueller & Aichele

Attys.

INVENTOR.
Henry Magnuski
BY
Mueller & Aichele
Attys.

United States Patent Office 3,380,023

Patented Apr. 23, 1968

3,380,023

ELECTRONIC ALARM SYSTEM

Henry Magnuski, Glenview, Ill., assignor to Motorola, Inc., Franklin Park, Ill., a corporation of Illinois Filed Jan. 21, 1964, Ser. No. 339,144

9 Claims. (Cl. 340—147)

ABSTRACT OF THE DISCLOSURE

An automatic electronic system for indicating interference or malfunction of a signal line provides for the transmission of a pseudo random pulse train over the signal line in addition to the information signal. The pseudo random pulse train is compared at the receiver with a similar pseudo random pulse train and any deviation between the two pulse trains, which may be due to line failure or a malfunction, causes an alarm signal to be generated.

Systems for protecting telephone and other signalling lines against interference by saboteurs, or other interference, have been proposed but have not been entirely satisfactory. For this reason it is customary to use armed guards for protecting lines on military installations, and in other places where lines are important and might be interfered with. In order to provide protection both day and night, a large amount of manpower is required and this involves substantial cost. Systems which have been proposed have the disadvantage that a person familiar with the system can cut and terminate the line in such a way that the interference with the line will not be detected at a monitoring station. Thus, while it appears that the line is operating satisfactorily to provide the required signalling, in fact the line may not be operating and the signals required to provide the desired operation may not be received.

It is, therefore, an object of the present invention to provide an improved system for protecting signalling lines against sabotage.

A further object is to provide an automatic electronic system for indicating interference with signalling lines by use of simple and flexible equipment which may be provided at reasonable cost, and which consumes a small amount of power.

Another object of the invention is to provide a system for applying signals over a line which signals provide information and at the same time may include alarm signals which indicate interference with the line.

A further object of the invention is to provide signalling over a line in such form that a saboteur, when monitoring the line, cannot distinguish if an alarm signal is transmitted on the line or not, and cannot detect which one of many different available alarm signal codes is being transmitted.

Still another object of the invention is to provide protection for a line, and alarm signalling thereover, without interfering with other uses of the line, such as telephone (voice) transmissions.

A still further object of the invention is to provide fail safe operation in a line protecting system, whereby an alarm will be sounded in case of failure of any electronic component of the system.

A feature of the invention is the provision of a system for providing pseudo random signals over a line, with the signals being inverted in a predetermined manner in accordance with information to be transmitted, and with the received signals being compared with signals obtained from a local pseudo random signal generator to derive information as well as an indication of interference with the line. The signals look alike to an outsider monitoring the line, whether or not the signals are inverted.

A further feature of the invention is the provision of a system for transmitting over a line in addition to audio frequency signals, either direct current pulses or pulsed tones of a frequency above or below the audio frequencies, so that the pulses which provide signalling and line protection do not interfere with audio frequencies or other signalling which can be transmitted independently over the line at the same time.

Another feature of the invention is the provision of a signalling system including a pseudo random signal generator for providing a pulse train at the sending station, with switching means for connecting an inverter in the circuit in response to operation of one or more sensors to provide a coded signal, and with a comparator and a second pseudo random signal generator at the receiving station which produces an output when the received signal differs from the pseudo random signal generated at this receiving station. The comparator output represents the signals transmitted and also gives an indication of interference with the line when the received signal does not correspond to the locally generated pseudo random signal or a coded inversion thereof.

Still another feature of the invention is the provision for transmission over the line of very long pseudo random pulse trains, with very many possible patterns to provide a high degree of security. These pulse trains may be composed of pulses a fraction of a second long which can be obtained using inexpensive transistors with very low consumption of power. Flexibility is obtained by providing many possible alarm codes consisting of combinations of dots and dashes, each containing several pulses.

Another feature of the invention is the provision of an alarm system providing completely fail safe operation, and wherein failure of any electronic component to operate properly causes the alarm to be sounded immediately, the only exception being failure of the comparator or of the alarm sounding equipment located at the receiving station, and this can be easily inspected to reduce failures, and can be duplicated to reduce the chance of failure of the system.

The invention is illustrated in the drawings wherein.

In practicing the invention, a system is provided for transmitting signals over a wire line. A pseudo random signal generator provides a pulse train which is of an almost random nature and does not repeat itself except over a very long time interval. An inverter is coupled to the pseudo random signal generator for producing an inversion of the pulse train. A relay circuit connects the output of the pseudo random signal generator, or alternatively the output of the inverter, to the signalling line to transmit pulses to the receiving station. The relay circuit may be controlled by alarm sensors responsive to any desired condition for applying a code signal from the sending station to the receiving station. Direct current pulses may be used in the system, and in such case, additional alternating current signals may be applied to the same line by proper isolation. At the receiving station the received signals are compared with signals from a local pseudo random signal generator which duplicates the pulse train at the sending station. A synchronizing circuit controls the pseudo random signal generator so that the pulses produced thereby are coincident with the pulses at the sending station. The comparator produces an output when the received signal differs from the transmitted signal and this output indicates when the signal has been inverted to reproduce the information transmitted in the form of long dots and dashes. In the event that the signal is not a direct one or is not inverted in accordance with a code applied at the sending station, the comparator produces frequent, short outputs, which constitute an alarm which indicates that some interference has occurred on the line or that the equipment has failed.

As stated above, the pulses may be applied to the line as direct current pulses, and alternatively the direct current pulses may be used to gate a tone signal so that AC signals are applied to the line. In either case, additional alternating current signals or voice signals may be applied across the line for other signalling purposes.

Figures 1, 2:
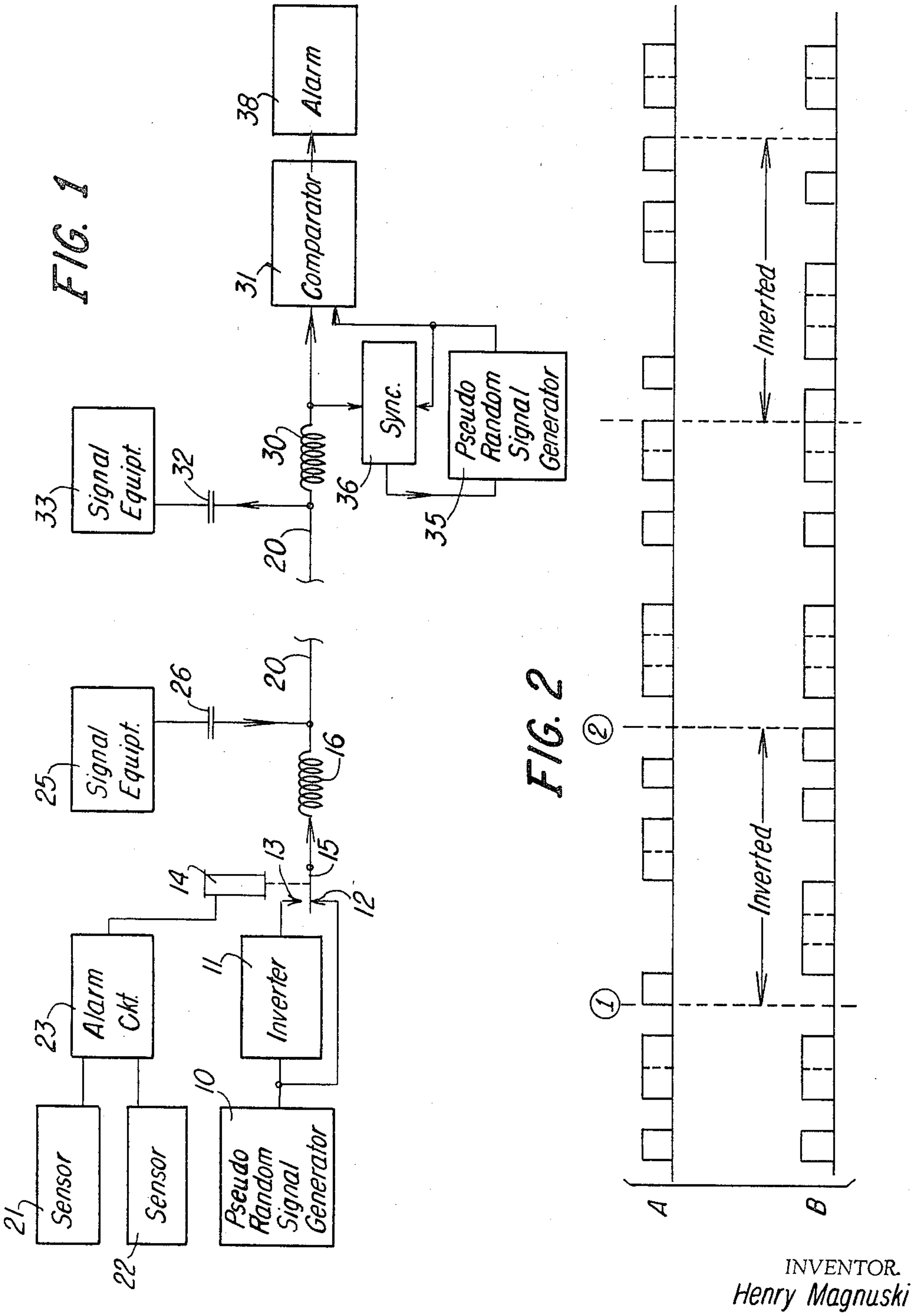
FIG. 1 is a block diagram of the system of the invention.
FIG. 2 illustrates the wave form of the pseudo random pulse train and the inversion thereof to transmit information.

Referring now to the drawings, in FIG. 1 there is shown the system of the invention including pseudo random signal generator 10. This may be a shift register type pulse generator as will be described. The generator includes means for setting up a pseudo random pattern which does not repeat over a long time interval, and which can be changed to increase the security.

Signals from the pseudo random signal generator 10 are applied to inverter 11 so that the pulse train at the output terminal 13 of the inverter is inverted with respect to the pulse train at the output terminal 12 of the random signal generator 10. The random signals are applied to relay contact 15, and through choke coil 16 to line 20. This may be a wire line of any type connecting different parts of an installation, such as different buildings or divisions of a military installation.

The sending station may include sensors 21 and 22 which provide various information such as the detection of fire, unauthorized entry, or approach of an enemy plane. The sensors 21 and 22 are connected to an alarm circuit 23 which operates the relay 14. Relay 14 operates the contact 15 thereof and moves this contact from terminal 12 to terminal 13 to supply inverted signals to the line 20. The alarm circuit may be arranged so that when sensor 21 operates, for example, inverted signals may be applied for predetermined time intervals. The inverted signals are interspersed with the direct signals to provide a code. When sensor 22 operates, a different timing of inverted signals may be used to provide a different code which can be distinguished.

When direct current pulses are applied to the line 20 from the pseudo random signal generator, other signals may be coupled thereto as by signalling equipment 25 which applies alternating current signals through capacitor 26 to the line. The choke coil 16 prevents the alternating current signals from being applied to the random signal generator 10, and the capacitor 26 prevents application of the direct current pulses to the signalling equipment 25.

At the receiving end of the line 20, the direct current pulses are applied through choke coil 30 to comparator 31. Any alternating current signals applied on the line will pass through capacitor 32 to the signalling equipment 33. The receiving station includes a pseudo random signal generator 35 which may be identical to the pseudo random signal generator 10 at the sending station. Signals from the pseudo random signal generator 35 are also applied to the comparator 31. The received signals and signals from the pseudo random signal generator are also applied to a synchronization circuit 36 which controls the clock of the pseudo random signal generator 35 so that the pulses produced thereby are in accurate synchronism with the received pulses. Known synchronizing circuits can be used which sample the received pulses and the pulses from the generator 35 to hold the generator in step.

The comparator 31 operates an alarm circuit 38 when the received signals do not correspond completely with the signals from the random signal generator 35. The alarm circuit 38 will indicate when signals are inverted in accordance with the code produced by alarm circuit 23 at the sending station in response to operation of sensor 21 or sensor 22, to thereby provide this information at the remote station. The alarm system will also indicate when the received signals randomly differ from the locally generated signals and do not correspond to any prearranged code or codes. In such case, the alarm will indicate that the line 20 has been interfered with or that some part of the system is not operating properly. This may be used to alert a watchman to check the line, it being unnecessary for the line to be continuously guarded to detect the presence of a saboteur.

In FIG. 2, line A shows a pulse train as produced by the pseudo random signal generators 10 and 35 in the system of FIG. 1. This pulse train may be formed of relatively slow pulses having a relatively long time duration, such as a quarter of a second, so that the pulse train can be transmitted over a system having small bandwidth. For maximum security, the pseudo random signal generator should have enough stages so that the signal will not repeat itself until after a very long time interval, such as several months or years. The generator should also include provisions for changing the pattern of the signal. This makes it difficult or impossible to determine the preselected pattern of the signal.

Line B of FIG. 2 illustrates the signal applied through the movable contact 15 of the relay 14 at the sending station, and which is received at the comparator 31 at the receiving station. It will be noted that the signal on line B corresponds to the signal on line A up to the point 1, and following this point the signal is inverted. This results from the operation of relay 14 at point 1 to connect contact 15 to terminal 13 so that inverted pulses are transmitted. At point 2, the relay 14 is released so that the movable contact 15 is again connected to terminal 12 to apply the direct pulses from the random signal generator 10 to line 20. The switching from direct to inverted pulses may be in accordance with a desired code and may indicate the actuation of various different sensors or devices of any type.

It will be apparent from a consideration of FIG. 2 that it would be difficult for one wishing to sabotage the line to reproduce the pulse trains utilized. Inasmuch as the pulse trains are almost random and do not repeat except over a long period of time, it would be extremely difficult to insert a generator producing the same pulse train. Even if a generator as used in the system had been obtained by some means, the interconnections to provide the particular pulse train pattern used in the system would not be known.

The inversion of the pulse train to provide information would not be apparent from the pulse train itself. That is, the pulse train with the inversions is still a random pulse train, and no change would be detected by observing the pulse train alone. Accordingly, the signal transmitted by the coded inversions of the pulse train could not be noted by one monitoring the line. However, at the receiving station, any change can be detected because the pseudo random signal generator at the receiving station produces the same pulse train as the pseudo random signal generator at the sending station. Since the codes utilized at the sending station will be known at the receiving station, information transmitted by the codes can be detected at the receiving station. However, when the signal received is not the original random signal, or such signal with the coded inversions, it will be apparent at the receiving station that the line has been interfered with, or that some equipment is not operating properly. In the event that no pulse train is received, it will be immediately apparent that the line 20 has been disabled.

Figures 3, 4:
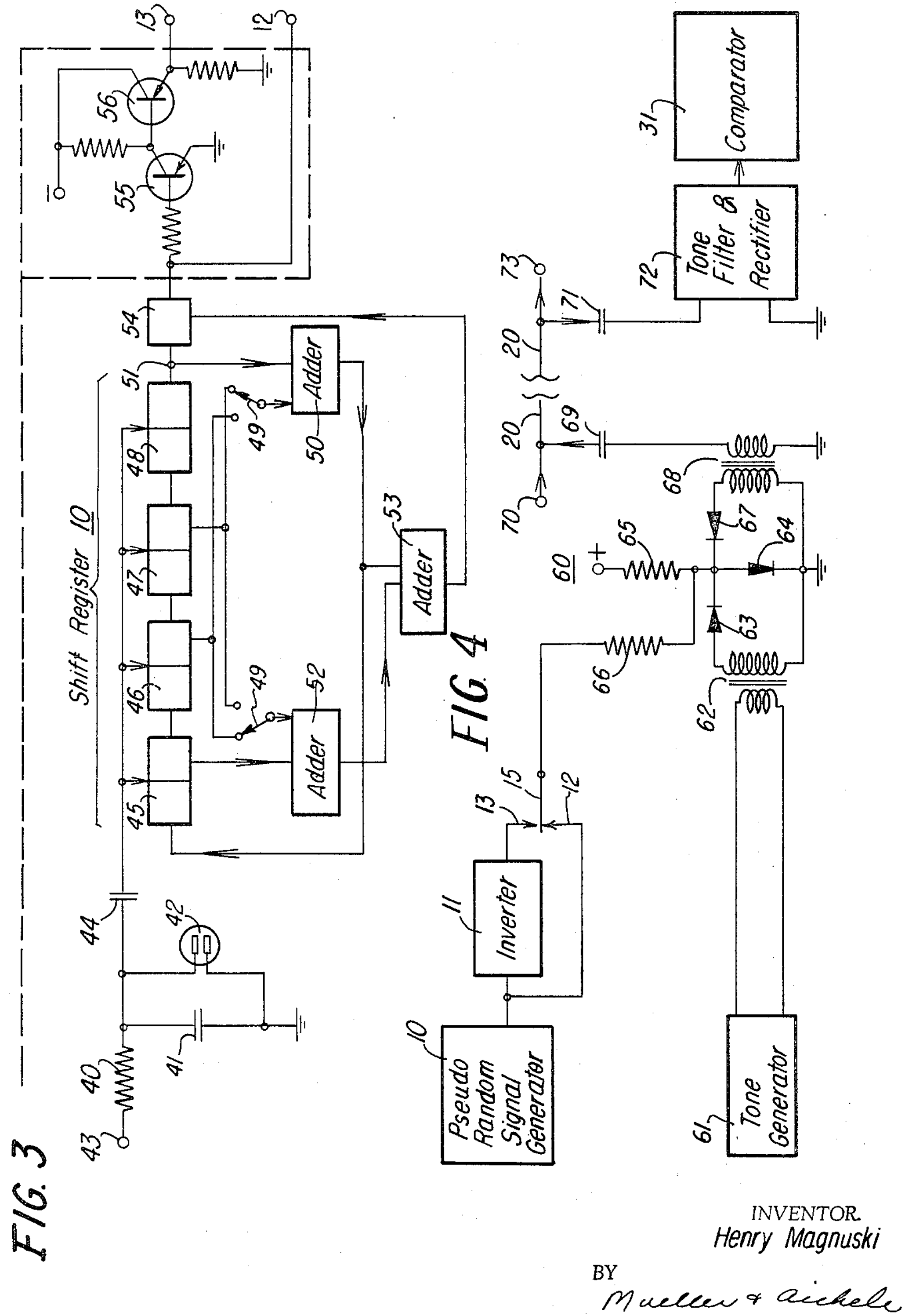
FIG. 3 illustrates more specifically the pseudo random signal generator and inverter of the system of FIG. 1.
FIG. 4 illustrates a modification of the system of FIG. 1 for operation with alternating current signals.

In FIG. 3 there is shown more in detail a representative circuit which may be used for the pseudo random signal generator 10 and the inverter 11. Clock pulses for the generator are provided by the circuit including resistor 40, capacitor 41 and neon bulb 42. The resistor 40 is connected to a negative potential 43 and charges capacitor 41 therefrom. When the voltage across capacitor 41 reaches a predetermined value, neon bulb 42 flashes to discharge the capacitor 41. This produces a clock pulse wave which is applied through capacitor 44 to the stages 45, 46, 47 and 48 of a shift register. It is to be pointed out that the stages 45 to 48 are merely representative and a very large number of stages might be used to provide an arbitrarily long train of pseudo random pulses.

The stages of the shift register are coupled to adders which operate a gate to provide a random pulse train. Adder 50 is actuated by the output pulses from stage 48 and the pulses from the second section of stage 47. The output of the adder is applied to the first stage 45 of the shift register so that the shift register produces a train of pulses at the output terminal 51. In order to change the sequence of pulses, additional adders 52 and 53 are provided. Again it is to be pointed out that the adders 52 and 53 are merely representative and a large number of adders can be used to provide very many pulse sequences. The adder 52 is coupled to the second sections of shift register stages 45 and 46, and the adder 53 is connected to the outputs of the adders 50 and 52. The output of adder 53 is used to actuate gate 54.

It is therefore seen that depending upon the condition of the various shift register stages, the gate 54 will be opened or not to pass the pulses at terminal 51. To change the pattern or sequence of the pulse train, the switches 49 may be operated for changing the connection of the adders to different stages of the shift register, to thereby change the resulting pulse train. When using a larger number of shift register stages, the number of changes which can be made is greatly increased. Also, the adders 52 and 53 may be replaced by circuits which may be connected either as adders or subtractors. Then by changing the connections, the actuation of the gate 54 is changed to change the output pulse train.

FIG. 3 also illustrates a representative circuit which may be used for the inverter 11. The inverter includes transistors 55 and 56. Transistor 55 is normally non-conducting and transistor 56 is normally conducting to provide a negative voltage at terminal 13. However, when a negative pulse is applied to the base of transistor 55, this transistor is rendered conducting to cut off transistor 56. This causes the terminal 13 to be returned to ground potential. When the negative pulse applied to transistor 55 is terminated, this transistor will be cut off and transistor 56 will conduct. This will cause the negative potential to be applied through the transistor 56 to terminal 13.

Referring now to FIG. 4, this shows a system in accordance with the invention wherein alternating current signals are applied to the line 20. In this system the same numbers are used to identify components which correspond to components of FIG. 1. The pseudo random signal generator 10 applies signals to terminal 12 and to inverter 11. Inverter 11 applies an inverted pulse train to terminal 13. Relay contact 15 is selectively connected to terminals 12 and 13 by operation of the alarm circuit as described in FIG. 1.

The pulse signals from contact 15 are applied to actuate gate circuit 60. Signals from tone generator 61 are applied to transformer 62 of the gate circuit. Diodes 63 and 64 are connected in series across the secondary winding of transformer 62. A positive voltage is normally applied through resistor 65 to the diodes to hold diode 63 non-conducting and diode 64 conducting. Accordingly, any signal applied to transformer 62 is interrupted by diode 63, and any current which passes through diode 63 is shorted to ground by diode 64. Diode 64 is bridged by diode 67 and the primary winding of transformer 68. The positive potential applied through resistor 65 also holds diode 67 cut off.

The pulses applied through switch contact 15 provide a negative potential through resistor 66 to the diodes 63, 64 and 67. This negative potential renders diodes 63 and 67 conducting, and diode 64 non-conducting. Diode 63 is connected in series with diode 67 to the primary winding of transformer 68, and these diodes when conducting complete the circuit for the tone signals from transformer 62 to transformer 68. Accordingly, the tone from generator 61 is applied through transformer 68 when a negative pulse is applied to the contact 15.

The pulses or bursts of tone in transformer 68 are applied through capacitor 69 to the line 20. Other alternating current or direct current signals may also be applied from terminal 70 to the line 20. When other alternating current signals are applied, these must be of a different frequency from the frequency of the signals produced by tone generator 61.

At the receiving end of the system, the tone signals are applied through capacitor 71 to tone filter and rectifier 72. Other signals which are applied through line 20 may be derived from terminal 73. The tone filter of the unit 72 is responsive to the frequency of the tone of generator 61, and provides an output when this frequency is received. This may be a standard resonant circuit filter, or an electromechanical filter. The tone selected by the filter is rectified and applied to comparator 31 which may be identical to the comparator 31 of FIG. 1. A pseudo random signal generator which may be identical to the pseudo random signal generator 10 at the sending station is also provided at the receiving station to apply a pulse train to comparator 31. The compartor then operates in the manner previously described in connection with the system of FIG. 1 to provide an output from which information transmitted from the sending station is derived. The output of the comparator also indicates when the line has been interfered with or when any electronic component failed, as in such case the received pulses will not correspond to the pulses from the generator or to a prescribed coded inversion thereof. No pulses will be received in case of failure of generator 10, inverter 11, tone generator 61 or gate 60.

The system of the invention therefore, provides an indication when the signalling line is interrupted or interfered with in any way. An intruder or saboteur tapping the line would find a random pulse train (of either DC pulses or AC tone pulses), and no difference in the pulse train would be detected from which information could be derived. In the event that a saboteur interrupted the line and applied a pulse train, this would be detected at the receiving station. Even if the saboteur had obtained a signal generator of the type used in the system, it would be necessary that the generator be set to provide the same random pulse train. This would be very difficult to do as the pulse train repeats only over very long intervals, and it would be difficult to determine the setting of the generator to provide the particular pulse train present on the line. This is particularly true because of the inversions of the pulse train, and if the signals being transmitted were not known, one monitoring the line could not tell whether various pulse sections were from the generator itself, or produced by inversions of the train from the generator. Accordingly, the system is very effective both from a security standpoint and to indicate any interference on the line.

I claim:

1. A communication system for operation with a communication channel extending between first and second points, said system including in combination, first and second pseudo random signal generators having outputs providing identical signals, inverter means having an input coupled to said output of said first generator and an output at which an inverted signal is produced, switch means for selectively connecting said output of said first generator and said output of said inverter means to the communication channel at the first point, comparator means at the second point having first and second inputs, means coupling said first input to the communication channel at the second point, and means connectiong said output of said second generator to said second input of said comparator means, said comparator means having an output at which a signal is produced when the signal received at the second point differs from the signal produced by said second generator.

2. A communication system including in combination, first and second pseudo random pulse generator means having outputs providing identical pulse trains, inverter means having an input coupled to said output of said first generator means and an output at which an inverted pulse train is produced, means providing a communication channel between said first and second points, switch means for alternatively connecting said output of said first generator means and said output of said inverter means to said channel means at said first point, comparator means having first and second inputs with said first input being coupled to said channel means at said second point, and means connecting said output of said second pulse generator means to said second input of said comparator means, said comparator means having an output at which a signal is produced when the pulse train received at said second point differs from the pulse train produced by said second pulse generator means.

3. A communication system for applying information over a communication channel from a first point to a second point and including in combination, first and second pseudo random signal generator means having outputs providing identical signals, inverter means having an input coupled to said output of said first generator means and an output at which inverted signals are produced, sensor means at the first point for providing a control signal in response to a measured event, control means coupled to said sensor means including switch means responsive to said control signal for selectively connecting said output of said first generator means and said output of said inverter means to the communication channel at said first point, comparator means having first and second inputs, means coupling said first input to the channel means at said second point, and means connecting said output of said second generator means to said second input of said comparator means, said comparator means having an output at which a signal is produced when the signals received at the second point differ from the signals produced by said second pulse generator means.

4. A communication system for applying information from a first point to a second point including in combination, first and second pseudo random pulse generator means having outputs providing identical pulse trains, inverter means having an input coupled to said output of said first generator means and an output at which an inverted pulse train is produced, said inverted pulse train having generally the same character as the pulse train produced by said first generator means, means providing a communication channel between said first and second points, control means coupled to said first generator means, said inverter means and said channel means, said control means including switch means for alternatively connecting said output of said first generator means and said output of said inverter means to said channel means at said first point to provide a predetermined pulse signal, comparator means having first and second inputs with said first input being coupled to said channel means at said second point, means connecting said output of said second pulse generator means to said second input of said comparator means, said comparator means having an output at which a signal is produced when the pulse train received at said second point differs from the pulse train produced by said second pulse generator means, and alarm means coupled to said comparator means and responsive to the signal produced thereby for indicating a fault in said channel means in response to a signal which differs from said predetermined pulse signal.

5. A communication system for applying information from a first point to a second point including in combination, first and second pseudo random pulse generator means having outputs providing identical pulse trains, inverter means having an input coupled to said output of said first generator means and an output at which an inverted pulse train is produced, said inverted pulse train having generally the same character as the pulse train produced by said first generator means, sensor means at said first point for providing a control signal in response to a measured event, means providing a communication channel between said first and second points, control means coupled to said sensor means, said first generator means, said inverter means and said channel means, said control means including switch means responsive to said control signal for alternatively connecting said output of said first generator means and said output of said inverter means to said channel means at said first point to provide predetermined coded pulse signals, comparator means at said second point having first and second inputs with said first input being coupled to said channel means, means connecting said output of said second pulse generator means to said second input of said comparator means, said comparator means having an output at which a signal is produced when the pulse train received at said second point differs from the pulse train produced by said second pulse generator means, and alarm means coupled to said comparator means and responsive to reception of a coded signal to indicate operation of said sensor means, said alarm means indicating a fault in said channel means in response to a signal from said comparator means which differs from said predetermined coded signals.

6. A communication system for applying information over a communication channel from a first point to a second point and including in combination, first and second pseudo random pulse generator means having outputs providing identical direct current pulse trains, said generator means including means for changing the random pulse trains produced thereby, inverter means having an input coupled to said output of said first generator means and an output at which an inverted pulse train is produced having generally the same character as the pulse train produced by said first generator means, sensor means at the first point for providing a control signal in response to a measured event, control means coupled to said sensor means, said first generator means and said inverter means, said control means including switch means responsive to said control signal for selectively connecting said output of said first generator means and said output of said inverter means to the channel means at the first point to provide predetermined coded pulse signals, comparator means at the second point having first and second inputs, means connecting said first input to the channel means at the second point, means connecting said output of said second pulse generator means to said second input of said comparator means, synchronizing means coupled to said second generator means and responsive to the received pulse train for holding the pulse train produced by said second generator means in synchronism therewith, said comparator means having an output at which a signal is produced when the pulse train received at the second point differs from the pulse train produced by said second pulse generator means, and alarm means coupled to said comparator means and responsive to reception of a coded signal for indicating the operation of said sensor means, said alarm means indicating a fault in said system in response to a signal from said comparator means which differs from said predetermined coded signals.

7. A communication system for applying information from a first point to a second point including in combination, first and second pseudo random pulse generator means having outputs providing identical pulse trains, inverter means having an input coupled to said output of said first generator means and an output at which an inverted pulse train is produced, tone generator means providing a tone signal of a given frequency, means providing a communication channel between said first and second points, gate means for connecting said tone generator means to said channel means at said first point, sensor means at said first point for providing a control signal in response to a measured event, control means coupled to said sensor means including switch means responsive to said control signal for alternatively connecting said output of said first generator means and said output of said inverter means to said gate means for operating the same to apply pulses of said tone signal to said channel means, filter and rectifier means coupled to said channel means at said second point for selecting tone signals of said given frequency and for producing pulses therefrom, comparator means having first and second inputs connecting said filter and rectifier means to said first input of said comparator means, and means connecting said output of said second pulse generator means to said second input of said comparator means, said comparator means having an output at which a signal is produced when the pulse train reproduced by said filter and rectifier means differs from the pulse train produced by said second pulse generator means, said signal indicating the operation of said sensor means and also indicating a fault in said channel means.

8. A communication system for applying information from a first point to a second point including in combination, first and second pseudo random pulse generator means having outputs providing identical pulse trains, inverter means having an input coupled to said output of said first generator means and an output at which an inverted pulse train is produced which has generally the same character as the pulse train produced by said first generator means, tone generator means providing a tone signal of a given frequency, means providing a communication channel between said first and second points, gate means for connecting said tone generator means to said channel means at said first point, sensor means at said first point for providing a control signal in response to an abnormal condition at said first point, control means coupled to said sensor means and including switch means connected to said output of said first pulse generator means, said output of said inverter means and said gate means, said control means being responsive to said control signal for operating said gate means to apply pulses of said tone signal to said channel means in predetermined pulse patterns, filter and rectifier means coupled to said channel means at said second point for selecting tone signals of said given frequency and for producing pulses therefrom, comparator means having first and second inputs, means connecting said filter and rectifier means to said first input of said comparator means, means connecting said output of said second pulse generator means to said second input of said comparator means, said comparator means having an output at which a signal is produced when the pulse train reproduced by said filter and rectifier means differs from the pulse train produced by said second pulse generator means, and alarm means coupled to said comparator means and responsive to said predetermined pulse patterns for indicating said abnormal condition measured by said sensor means, and responsive to other signals from said comparator means to indicate a fault in said channel means.

9. A communication system for applying information from a first point to a second point including in combination, first and second pseudo random pulse generator means having outputs providing identical pulse trains, said pulse generator means including means for changing the pattern of the pulse train produced thereby, inverter means having an input coupled to said output of said first generator means and an output at which an inverted pulse train is produced, tone generator means providing a tone signal of a given frequency, means providing a communication channel between said first and second points, gate means for connecting said tone generator means to said channel means at said first point, sensor means at said first point for providing a control signal in response to an abnormal condition at said first point, control means coupled to said sensor means and including switch means connected to said output of said first pulse generator means, said output of said inverter means and said gate means, said control means being responsive to said control signal for operating said gate means to apply pulses of said tone signal to said channel means in predetermined pulse patterns, filter and rectifier means coupled to said channel means at said second point for selecting tone signals of said given frequency and for producing pulses therefrom, comparator means having first and second inputs, means connecting said filter and rectifier means to said first input of said comparator means, means connecting said output of said second pulse generator means to said second input of said comparator means, synchronization means connected to said second pulse generator means and to said filter and rectifier means to hold the pulse train produced by said second pulse generator means in synchronization with the pulse train reproduced by said filter and rectifier means, said comparator means having an output at which a signal is produced when the pulse train reproduced by said filter and rectifier means differs from the pulse trains produced by said second pulse generator means, and alarm means coupled to said comparator means and responsive to said predetermined pulse patterns for indicating said abnormal condition measured by said sensor means, and responsive to other signals from said comparator means to indicate a fault in said channel means.

References Cited

UNITED STATES PATENTS

| | | | |
|---|---|---|---|
| 2,504,999 | 4/1950 | McWhirter et al. | |
| 3,131,376 | 4/1964 | Du Vall | 340—147 |
| 3,171,108 | 2/1965 | MacKeen. | |

JOHN W. CALDWELL, *Primary Examiner.*

THOMAS B. HABECKER, *Examiner.*

D. YUSKO, *Assistant Examiner.*